Aug. 22, 1950 F. H. OWENS 2,519,597

DISK RECORD AND FILM RECORD SOUND REPRODUCER

Filed Aug. 6, 1943 3 Sheets-Sheet 1

Inventor
Freeman H. Owens
By James & Franklin
Attorneys

Aug. 22, 1950 F. H. OWENS 2,519,597

DISK RECORD AND FILM RECORD SOUND REPRODUCER

Filed Aug. 6, 1943 3 Sheets-Sheet 2

Inventor
Freeman H. Owens
By James & Franklin
Attorneys

DISK RECORD AND FILM RECORD SOUND REPRODUCER

Filed Aug. 6, 1943 3 Sheets-Sheet 3

INVENTOR.
Freeman H. Owens

BY James & Franklin
Attorneys

Patented Aug. 22, 1950 2,519,597

UNITED STATES PATENT OFFICE 2,519,597

DISK RECORD AND FILM RECORD SOUND REPRODUCER

Freeman H. Owens, New York, N. Y.

Application August 6, 1943, Serial No. 497,590

18 Claims. (Cl. 179—100.1)

This invention relates to a sound reproducer and has special reference to the provision of a combined disc record and film record phonograph or sound reproducer, especially designed for home use.

The prime object of my present invention centers about the provision of a sound reproducing machine designed to be used for either the usual disc type of phonograph record or with a film type of sound record, i. e., a film having a sound record photographically recorded thereon.

In carrying out this prime object, it is the main desideratum of the present invention to provide a combined reproducing machine in which the disc record turntable and its drive and the film record operating mechanism and its optical system are combined in a most simple manner and for optimum usefulness and service.

The present application is a companion to my copending application Serial No. 494,605, filed July 14, 1943, now Patent No. 2,466,124, granted April 5, 1949, entitled "Disc Record and Film Record Phonograph Reproducer." In that application is disclosed the general organization of the home reproducer of the present invention. This comprises a machine embodying a turntable for disc records, a support for a film record magazine, a common driving means for both the disc record and the film record, and an optical reproducing system for the film record, all so related that either a disc record or a film record may be selectively used and played in the machine with optimum ease and convenience.

In the operation of this combined machine a number of disiderata are required to be fulfilled. When a disc record is to be played, it is desired to operate the machine after the manner of a simple phonograph. When a film record is to be played, it is desired to drive the film from the motor and driving means used for the disc record and at the same time to operate and control the optical reproducing system used with the film record. When a disc record is being played, this optical reproducing system is held inoperative. It is also desired that when a film record reaches the end of its playing period that the driving means be stopped and the optical reproducing system be cut off, and that these functions be accomplished without altering the operability of the machine for a subsequent selective disc record or film record use. These and other desiderata are accomplished by a control arrangement and automatic cut-off mechanism which forms the particular objects of invention of the present application.

To the accomplishment of the foregoing and such other objects as may hereinafter appear, my invention relates to the combined disc record and film record reproducing machine, the control and automatic cut-off mechanism therefor, and the elements thereof, as hereinafter more particularly described in the specification and sought to be defined in the claims. The specification is accompanied by drawings in which:

Figure 1:
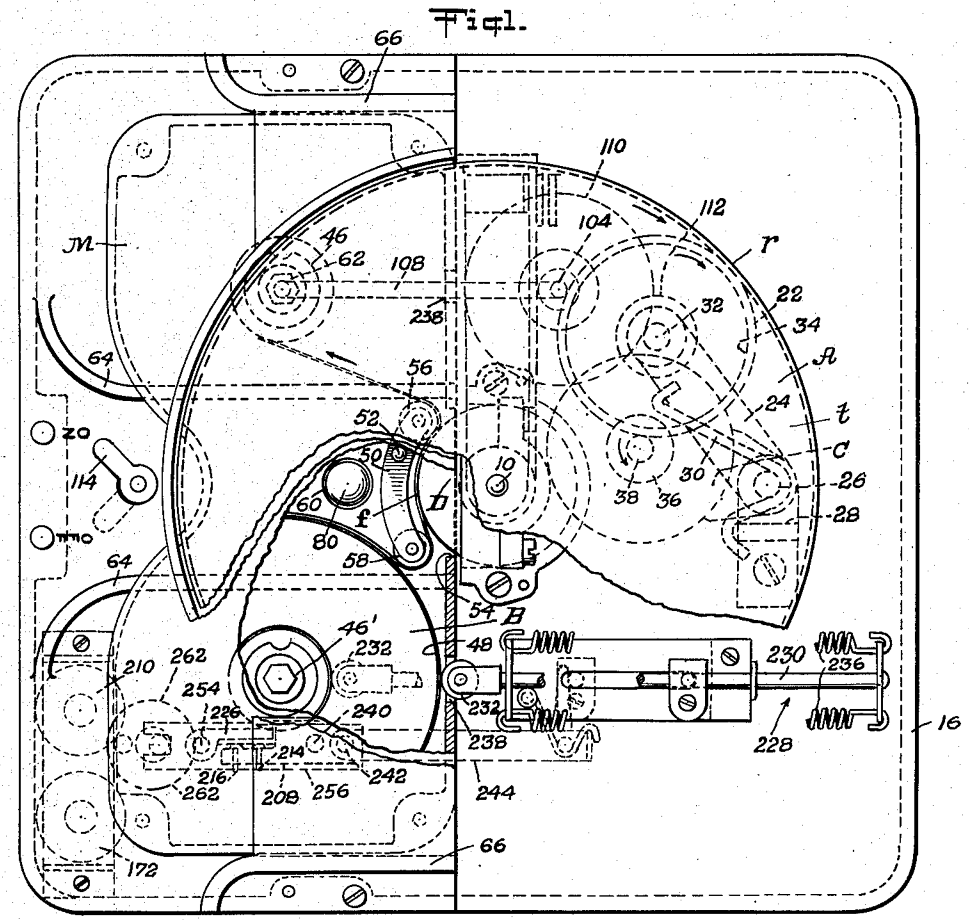
Fig. 1 is a top plan view of the combined disc record and film record sound reproducer with parts broken away to better show the construction thereof.
Figure 2:
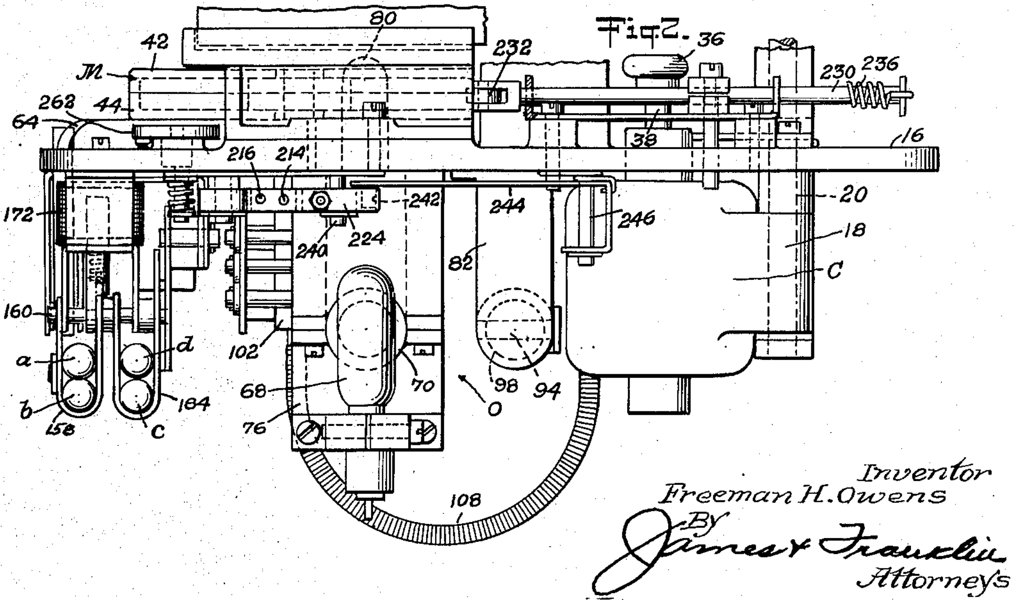
Fig. 2 is a side elevational view thereof.
Figures 3, 4, 5:
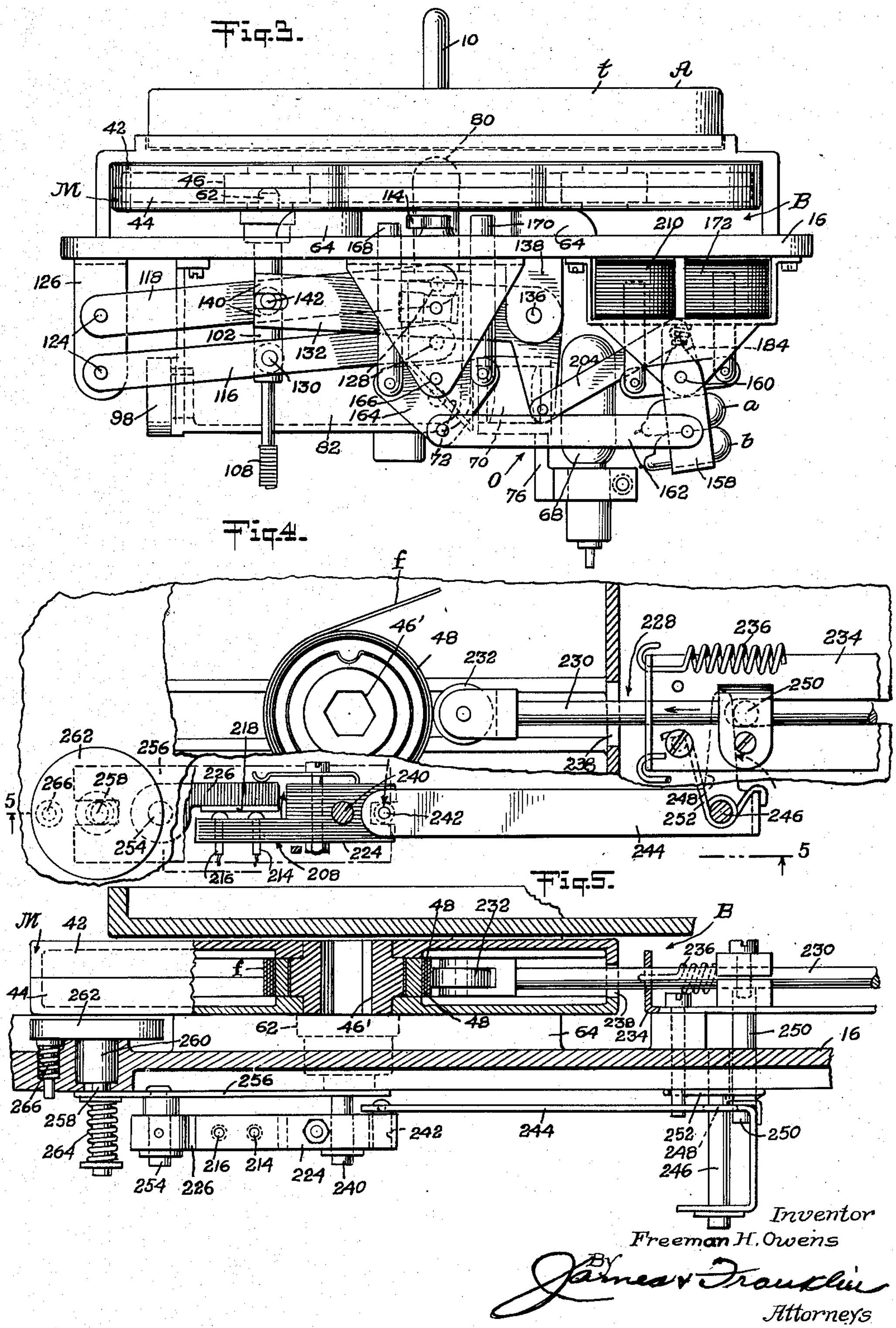
Fig. 3 is a front elevational view thereof.
Fig. 4 is a view shown on an enlarged scale of certain parts of the control and cut-off mechanism employed.
Fig. 5 is a view of the latter taken along the broken line 5—5 of Fig. 4.

Referring first to Figs. 1 to 3 of the drawings, the general organization of the parts of the machine may be first described, these parts being shown with greater particularity and in greater detail in my aforesaid copending application Serial No. 494,605, filed July 14, 1943. The sound reproducer comprises a disc record reproducer generally designated as A and a film record reproducer generally designated as B, arranged therebeneath, both operatable from the same power source such as the motor generally designated as C. The disc record reproducer A is designed along conventional lines to include the usual turntable *t* driven from the motor C as by means of a rim driving mechanism *r* (see Fig. 1). The film record sound reproducer B is organized and coordinated with the disc record reproducer A in a manner to provide a combined disc record and film record reproducing machine offering all of the constructional and operational advantages described herein and in my aforesaid copending application.

The disc record reproducer part of the combination comprises a conventional form of turntable *t*. The motor C, pendently supported by the supporting plate 16 by means of a motor bracket 18 which may be adjustably (rotatably) mounted in the supporting stud 20 (see Fig. 2) is connected to the turntable by means of the said rim driving mechanism *r*.

This rim driving mechanism preferably comprises a friction wheel 22 rotatably mounted on the free end of an arm 24 hinged at 26 in a stud bracket 28 fixed to the support 16, the said arm and the wheel 22 mounted therein being urged by the spring 30 to turntable rim engaging position, as best shown in Fig. 1 of the drawings. Fixedly attached to the wheel 22 or to its shaft 32 is the flanged wheel 34 the flanges of which are engaged by a wheel 36 which is keyed or otherwise fixed to the shaft 38 of the motor C. The motor C may be adjusted about its supporting stud 20 to vary the engagement position of the wheel 36 with the flanged wheel 34 to predetermine the speed of rotation of the turntable *t*. When the motor is energized, the wheels 36, 34 and 22 and the driven turntable *t* rotate in the directions indicated by the arrows in Fig. 1 of the drawings. This disc sound reproducer may be employed with any approved type of reproducer.

The essential parts of the film record sound reproducer comprise the operating mechanism for the sound record film and the optical system therefor. Both the operating mechanism and the optical system are supported by the main supporting plate 16 in such a way that the parts required to be normally accessible are located above the supporting plate 16 and the parts not required to be normally accessible are located below the supporting plate 16, which latter, together with the supporting plate, are arranged so as to be capable of being housed in a suitable casing or cabinet. The main component parts of the film record reproducer may be said to comprise the film magazine *m* containing the film record *f*, a driving means for the film record which includes a drive wheel D which is peripherally engaged by the film *f* (see particularly Fig. 1) and an optical system O (see particularly Fig. 6) for translating the photographic sound record on the film into electrical pulsations for producing the audible response, the said optical system O comprising an exciter portion E located on one side of the film and a reproducer portion R located on the other side of the film.

The magazine *m*, comprising a split or two-part casing having the top half 42 and the bottom half 44, is provided with two spools, 46 and 46' (receivable in registering magazine openings), either spool serving as the take-up or the supply spool. In the operation shown, spool 46 is the take-up spool and spool 46' is the supply spool containing a film supply reel 48. Mounted in the magazine is an arcuate shaped guide arm 50 pivotally mounted as at 52 behind a magazine opening 54. The guide arm 50 is provided at its opposite ends with the film guide rolls 56 and 58 (see Fig. 1). The spools 46 and 46' are cored and thus open at their opposite ends (see Fig. 5). Between the spools 46 and 46', the magazine *m* is provided with the registering openings 60 (see Fig. 1). This magazine is adapted to be used with a film *f* having two longitudinal film records whereby the magazine may be used without the necessity of rewinding the film. During the operation shown in the drawings, a film *f* moving in the direction indicated by the arrow (Fig. 1) is supplied from the supply reel 48 and is wound or reeled on the take-up spool 46. During this operation, one of the two longitudinally arranged records is played. When this is finished, the magazine *m*, after being removed from the machine, is turned over (so that the top half 42 is now at the bottom), the spool 46' now becoming the take-up spool, and the second longitudinally arranged record being now in a position to be reproduced. As the film *f* is drawn in either case and thereby tensioned by the take-up spool, it acts against the guide roller 56 to cause the guide arm 50 to move towards the drive wheel D to peripherally engage this drive wheel for driving contact with the film *f* therebetween.

The means for propelling the film *f* comprises the said driving wheel D and a coupling member 62 movable into engagement with the take-up spool 46 for driving the latter. The machine is so constructed that the magazine *m* may be moved into and out of operative position by simply sliding the magazine in a support provided therefor. When the magazine is slid into its operative position, the driving wheel D enters the magazine opening 54 and the film in the magazine is caused to be engaged between the driving wheel D and the elements of the guide arm 50. The coupling member 62 is then moved into the core of the take-up spool 46 and thus into driving position as shown in Fig. 3 of the drawings. The support for the magazine comprises simply the two central rails 64, 64 and the two side rails 66, 66 fixed to the plate support 16. When moved into its operative position, the magazine *m* is locked in such position by means of the coupling member 62 and also by means of a part 80 of the optical system which is moved into the openings 60 (two registering openings) in the magazine (see Fig. 1). The film driving wheel D comprises a transparent glass annulus which is fixed or secured to the turntable spindle 10 and, therefore, is actuated thereby being rotated by and with the turntable *t*. This drive wheel D functions as part of the optical system O of the machine.

The exciter portion E of the optical system comprises the means for projecting a beam of light towards one side of the film *f* for transmission through said film and the transparent drive wheel D. This is shown schematically in Fig. 6 of the drawings. This comprises the source of illumination 68, the condensing lens system 70, the reflectors 72 and 74, all arranged in optical sequence. The source of illumination or lamp 68 and the condensing lens 70 are mounted in a bracket 76 (see Figs. 1 and 2) pendently secured to the supporting plate 16. In the operative position depicted in the drawings, light is transmitted from the lamp 68 to and through the film *f* and the transparent drive wheel D.

The reproducing portion R of the optical system O comprises an optical mount 82 pendently secured to the supporting plate 16 (see Figs. 2 and 3). Within this mount 82 is arranged the reflector 90, the lens system 92, the reflecting system 94 and the photo-electric cell 98 (see Fig. 6), all arranged in optical sequence. Therefore, light transmitted through the film *f* and the transparent drive wheel D to the center or axis of the drive wheel where the reflector 90 is located is reflected and projected so as to be incident upon the photo-electric cell 98 which latter is connected as is customary in systems of this character, to an amplifying and loud speaker system generally shown in Fig. 6 of the drawings.

The take-up spool coupling member 62 is connected to be driven from the motor C by means of a coupling member bearing 102 (see Fig. 3), a shaft 104 connected to a flanged wheel 110 and a flexible connection or shaft 108 uniting the bearing 102 with the shaft 104. The flanged wheel 110 is peripherally geared to a driving wheel 112 fixed to the shaft 32. By means of this gearing connection the take-up wheel will be driven at the required reduced speed when the motor C is energized to rotate the turntable *t* and the driving wheel D.

The vertical movement of the coupling member 62 (as well as the reflector mount 80) into and out of operative position (with relation to the magazine *m*) is accomplished by any suitable mechanism manually operable at a convenient location. These are operated by moving a manually operable arm or handle 114 mounted centrally on the support 16 between the "on" and "off" positions indicated in Fig. 1 of the drawings. This mechanism is associated, as will be described hereinafter, with the switch controlling means of the machine.

The handle 114 operates a lever structure comprising the parallel levers 116 and 118 fulcrumed at their outer ends as at 124 to a supporting bracket 126 (see Fig. 3), the inner ends being connected by means of pins 128 to the reflector mount 80 (the details of this construction are best shown in my aforesaid copending application). The medial portions of these levers are connected by means of the pins 130 to the coupling bearing 102. When these levers 116 and 118 are moved (upwardly and downwardly) both the coupling member 62 and the reflector mount 80 will be caused to ascend and descend as the case may be. These levers are actuated by means of a lever 132 anchored or fulcrumed as at 136 to a bracket 138, the outer bifurcated ends 140 of this lever being received by an extension 142 of one of the pins 130 extending from the movable bearing 102. This lever 132 (and a companion lever) is provided medially with a pair of cam followers which cooperate with a rotatable cam member fixed to a shaft on which the handle 114 is keyed (diagrammatically shown in Fig. 3 but best shown in my aforesaid copending application). Upon rotative movement of the handle 114, the operation of the cam causes the lever 132 to ascend and descend between limiting positions and in turn causes the parallelogrammatic lever system 116 and 118 to operate the coupling member (as well as the reflector member).

By means of this recited construction, when it is desired to charge the machine with a film containing magazine, the handle 114 is moved to the "off" position if it is not already in that position; this moves the coupling member 62 (and the lens mount) to a descended position, permitting a film magazine *m* to be slid in its support into operative position. The handle 114 is then moved to the "on" position and thereby the coupling member 62 (and the reflector mount 80) is caused to ascend into the positions best shown in Fig. 3 of the drawings. The coupling member is thereby coupled to the take-up spool 46 and the magazine *m* is thereby locked in operative position.

Figure 6:
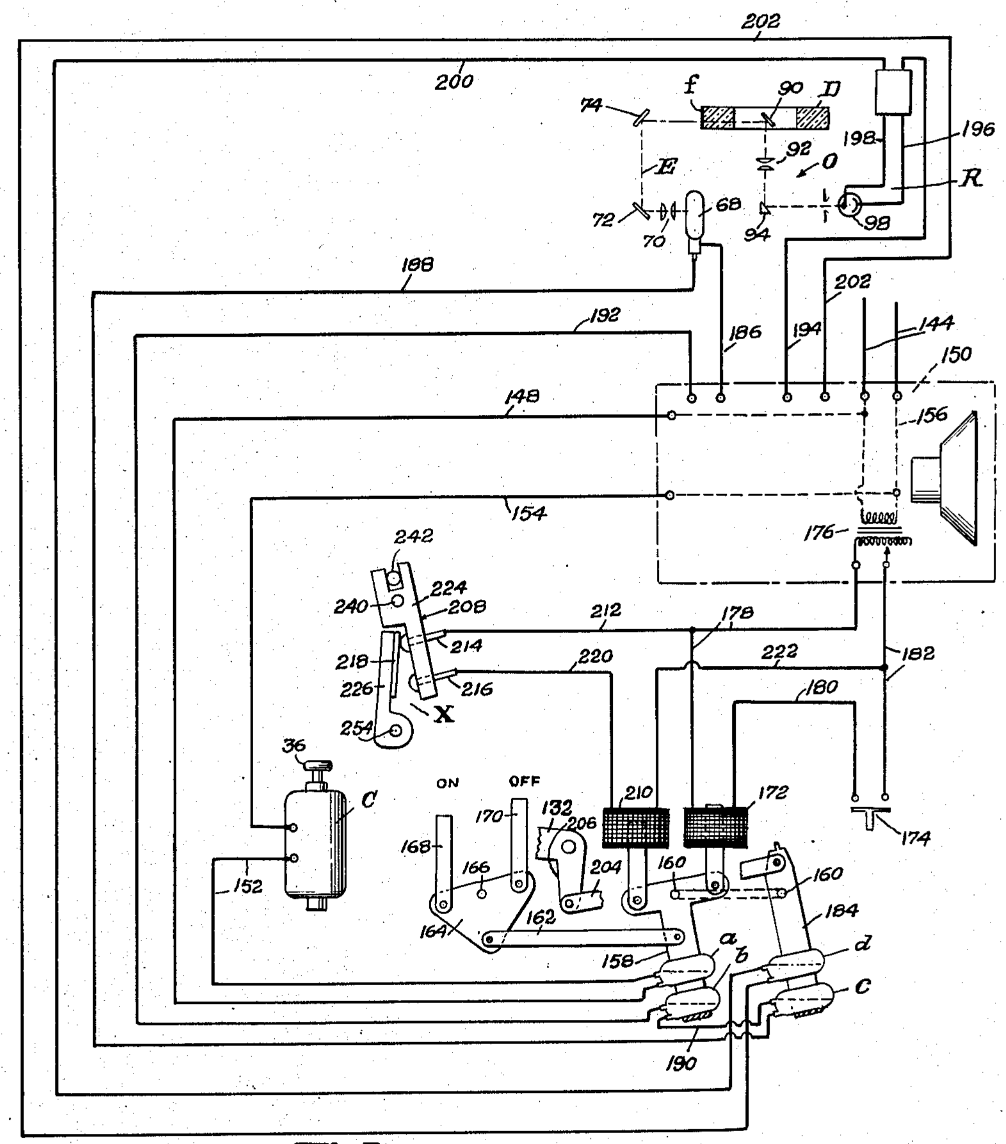
Fig. 6 is a wiring diagrammatic view explanatory of the control mechanism for the machine.
Figure 7:
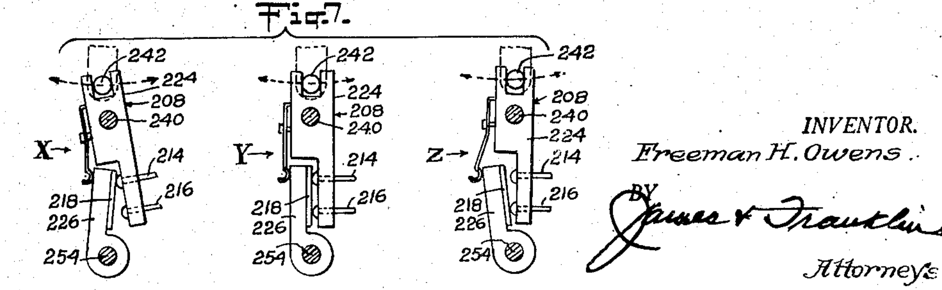
Fig. 7 is a view showing a switch member employed in the control mechanism and illustrating the three different positions of this switch member.

The control mechanism for this combined machine may be best understood by reference first to the diagrammatic showing of Fig. 6 of the drawings and the positions of the switch member shown in Fig. 7. The common motor C is connected to the power lines 144 through a mercury switch *a*, this being traced by the conductor 148 connected to one side of the power line at the board 150 to the mercury switch *a*, conductors 152, motor C, and conductors 154, 156 to the other side of the power line. The mercury switch *a* is mounted on a support 158 oscillatable on a pivot 160 and connected by means of a link 162 to a plate 164 oscillatable about a pivot 166 provided with the "on" and "off" buttons 168 and 170. When the button 168 is pushed, the support 158 is moved to the position shown in Fig. 6 to close the mercury switch and the motor circuit, and when the button 170 is pushed, the support 158 is oscillated in a clockwise direction to open the mercury switch and the motor circuit.

This motor circuit may also be operated by remote control, by means of a solenoid 172 connected by means of the switch 174 to a transformer 176, in turn connected to the power source 144. The controlling circuit for this may be traced as follows: The transformer 176 is connected directly to the power source 144. From one side of the secondary of the transformer the circuit comprises the conductors 178, solenoid 172, conductor 180, switch 174 and conductors 182. By closing the switch 174 located at a remote point, the solenoid 172 is operated to move the mercury switch *a* to the same position to which it is moved by the "on" button 168.

It will be understood that by operating either the "on" button 168 or the remote control switch 174, the motor circuit is energized for driving either a disc record or a film record. The film record is driven when a magazine has been placed in position. At that time the turntable will rotate and act as a fly wheel for the film drive; in the absence of a magazine the turntable alone will rotate for playing a disc record.

The lamp 68 of the exciter circuit E is connected to power by way of two separate mercury switches *b* and *c*, the switch *b* being fixed on the support 158, and the switch *c* being fixed on an independent oscillatable support 184 oscillatable about the same pivot 160 about which the support 158 oscillates. The circuit for this comprises conductor 186 connected to one side of the power line at the board 150, lamp 68, conductor 188, switch *c*, conductor 190, switch *b*, and conductor 192, to the other side of the power line. When the motor switch *a* is closed, the exciter switch *b* is also closed, but unless the exciter switch *c* is closed, the exciter circuit remains open. This exciter circuit is closed only when both switches *b* and *c* are closed.

The reproducer side of the optical system, namely, the photo-electric cell 98, is operated by way of a mercury switch *d* fixed to the oscillatable support 184. The circuit for this comprises the conductor 194 connected to one side of the line at the board 150, conductor 196, photo-electric cell 98, conductors 198 and 200, switch *d* and conductor 202 back to the other side of the line.

The oscillatable support 184 on which the switches *c* and *d* are mounted is connected by means of a link 204 to the short arm 206 of the hereinbefore described lever 132. Thus when the handle 114 is moved to connect the drive to the take-up spool of the magazine and to lock the magazine into position (Figs. 1 and 3), the oscillatable support 184 is moved to the position shown in Fig. 6 of the drawings to close the switches *c* and *d*.

The following operations are thus rendered possible: When it is desired to play a disc record, only the push-button 168 (or the remote control switch 174) is operated. This puts on the motor circuit. As will be described below, the cut-off mechanism is left in such a position as to permit this simple operation to take place. If it is desired to play a film record, the film magazine is placed into the machine and the handle 144 is operated to the "on" position. This effects the closing of the switches c and d. The reproducer circuit R is thus closed, but the exciter circuit E still remains open. Then the "on" button 168 is pushed thereby closing the motor circuit and completing the exciter circuit. The film is driven and optical reproduction effected. By pushing the "off" button 170, this operation of the motor and exciter circuits may be stopped at any point. The retention in that case of the reproducer circuit R does not affect the operation of the machine. When the magazine is removed, the additional switches c and d, of course, have to be opened first (to unlock the magazine); and the reproducer circuit R is also thereby opened. Thus the combined machine may be selectively operated manually to start, play and stop the same for either a disc record or a film record.

In addition to this manual operation, I provide mechanism for cutting off the operation of both the motor C and the optical reproducing system O when the film has reached the end of a playing period. This mechanism is operated by the film and with either longitudinal record thereon. The mechanism is furthermore so constructed that the operator becomes aware as to whether the film magazine (which is reversible) is being placed into the machine in the right position (that is, with the supply and take-up reels in their correct positions). This mechanism is also so constructed that it will operate only for the film record and so that in the absence of the film record the machine is always left in a condition where it is operable for disc records.

Referring first to Figs. 6 and 7 of the drawings, I provide a switch member generally designated as 208 which is normally in an inoperative position Z (Fig. 7) and which is movable by the insertion of the film magazine into another operative position X, and which is movable when the supply reel of the magazine has been depleted (at the end of a film run) into an operative position Y. This switch member is associated with a solenoid 210, the movable core of which is connected to the oscillatable support 158. The circuit connecting the switch member and the solenoid comprises the conductor 212 leading from the transformer secondary 176, the switch contacts 214 and 216, the bridging switch plate 218, conductor 220, solenoid 210, and conductors 222 and 182 back to the secondary. The contacts 214 and 216 are mounted on a rockable lever 224 and the plate 218 is mounted on the rockable arm 226. When this described circuit is closed (position Y), the solenoid 210 is operated to open switches a and b, thus deenergizing the motor C and the exciter circuit E.

The mechanism for operating the switch member 208 is best shown in Figs. 4 and 5. This comprises an actuator generally designated as 228. The actuator comprises a linearly movable rod 230 having at its advance end a roller 232 adapted to engage the supply reel 48. The rod 230 is mounted in a plate 234 and is urged to reel-engaging position by means of the springs 236 (see particularly Fig. 1). The roller 232 is receivable through an orifice 238 in the film magazine (one such orifice being provided at each magazine end). When the film magazine is inserted in position, engagement of the supply reel with the roller moves the rod 230 rearwardly into the position shown in full lines in Fig. 1. This act apprises the user as to whether or not the film magazine has been inserted with the supply reel in the right position. As the supply reel is paid off, the rod 230 moves from the full line position shown in Fig. 1 to positions indicated by the dotted line in this figure. This movement is employed for actuating the switch member 208.

The lever 224 of this switch member is rockable about a pivot 240. The forked end of this lever receives a pin 242 connected to a bell crank lever 244 which pivots about a pin 246, the short arm 248 of which is adapted to be engaged by a pin 250 depending from the rod 230. A spring 252 is operative on the bell crank lever urging the same into a position for moving the switch member into its X position.

With this construction of the parts, the following functions and operations are producible: When a film magazine is properly placed in position in the machine, the rod 230 of the actuator is moved to the full line position shown in Fig. 1. The spring 252 operates on the lever 244 to cause the switch 208 to move to its position X shown in Fig. 6. As the film is paid out, the rod 230 moves in the direction shown by the arrow in Fig. 4. When the end of the film is reached, the rod pin 250 engages the bell crank lever 244 moving the same in the direction shown by the arrows in Fig. 4. This causes the closing of the switch circuit, the switch 208 moving to the position shown in Fig. 4, this being its position Y. The motor circuit is thereby deenergized. Due to the momentum of the parts and before the machine comes to a stop, some more of the film is paid out, the rod 230 continues to move incrementally, with the result that the lever and switch parts continue their motion, the switch member being thereby moved to its other inoperative position Z. The solenoid 210 is thereby only momentarily actuated. When the film magazine is removed from the machine, the switch member 208 remains in the position Z, thus leaving the machine ready to be operated by the push-button 168 or the remote control switch 174.

For adjusting for the predetermined point at which the switch member 208 assumes the closed or Y position, I provide adjusting means for the switch 208. This is accomplished by mounting the members 224 and 226 by means of their pivot pins 240 and 254 in a plate 256, the plate being anchored by means of the pin 240 to the main plate 16 and being connected at its other end to a shaft 258 fixed to a button 260 eccentrically seated in the plate 16 and provided with a rotatable adjusting plate 262. A spring 264 yieldably mounts the plate 256 on the shaft 258, and the adjusting button 262 is held in an adjusted position by means of the resilient element 266. Adjustment of the button 262 moves the plate 256 which results in incrementally adjusting the arm 226 relative to the lever 224.

The principles of construction, the mode of operation and the manifold functions of the combined reproducer of the present invention will in the main be fully apparent from the above detailed description thereof, and it will be further apparent that many changes may be made in the construction thereof without departing from the spirit of the invention defined in the following claims.

I claim:

1. A disc record and film record sound reproducer, in combination, a turntable for disc records, a support for a film magazine, a common driving means for the turntable and its disc record and for the film record, an optical reproducer system for the film record, an electrical circuit for the driving means, an electrical circuit for the optical reproducer system, manual means for selectively energizing said circuits either to drive the turntable and the film and to operate the reproducer system or to drive the turntable without operating the reproducer system, and automatic cut-off mechanism controlled by the film and operated by the end of the film for deenergizing said circuits to stop the drive of the turntable and the film and the optical reproduction of the film record.

2. A disc record and film record sound reproducer, in combination, a turntable for disc records, a support for a film magazine, a common driving means for the turntable and its disc record and for the film record, an optical reproducer system for the film record, an electrical circuit for the driving means, an electrical circuit for the optical reproducer system, switch means for the driving means circuit, switch means for the reproducer system circuit, selective manual means for either operating both switch means to energize both circuits to drive the turntable and the film and to operate the reproducer system or for operating one of the switch means to drive the turntable without operating the reproducer system, and automatic cut-off mechanism controlled by the film and operated by the end of the film for operating both switch means for deenergizing both said circuits to stop the drive of the turntable and the film and the optical reproduction of the film record 3. In a disc record and film record sound reproducer in which the disc record and the film record are drivable from a common motor, an electrical circuit for the motor, a switch means for the motor circuit, manual means for operating the switch means, and automatic cut-off mechanism operated only when a film record is being driven for operating the switch means to deenergize the motor circuit, said cut-off mechanism being connected so as to be controlled by the film and operated when the film reaches the end of its playing period.

4. In a disc record and film record sound reproducer in which the disc record and the film record are drivable from a common motor, an electrical circuit for the motor, a switch means for the motor circuit, manual means for operating the switch means, and automatic cut-off mechanism operated only when a film record is being driven for operating the switch means to deenergize the motor circuit, said cut-off mechanism comprising a normally inoperative switch member and an actuator therefor, said actuator being positionable by engagement with the supply reel of said film record and being movable to an inoperative position by the supply reel when the film record is placed into the reproducer, to an operative position to actuate the switch member when the supply reel is depleted and to an inoperative position when the film record is removed from the reproducer.

5. In a disc record and film record sound reproducer in which the disc record and the film record are drivable from a common motor, an electrical circuit for the motor, a switch means for the motor circuit, manual means for operating the switch means, and automatic cut-off mechanism operated only when a film record is being driven for operating the switch means to deenergize the motor circuit, said cut-off mechanism comprising a normally inoperative switch member and an actuator therefor, said actuator being positionable by engagement with the supply reel of said film record and being movable to an inoperative position by the supply reel when the film record is placed into the reproducer, through an operative position to actuate the switch member when the supply reel is depleted and thereafter again to an inoperative position as the motor is brought to a stop.

6. In a film record sound reproducer, in combination with a magazine, a film record in the magazine and a driving means for the film record, an automatic cut-off mechanism operated by the film record for stopping the driving means comprising a normally inoperative switch member and an actuator therefor and operatively connected thereto, said actuator being automatically positionable by engagement with the supply reel of said film record, said actuator being movable from a normally inoperative position to another inoperative position by the supply reel engaging the same when the film record is placed into the reproducer and being then movable first to an operative position to actuate said switch member as the reel is depleted and then to its normal inoperative position after the switch member has been actuated.

7. In a film record sound reproducer, in combination with a magazine, a film record in the magazine and a driving means for the film record, a switch means for the driving means, manual means for operating the switch means, an electromagnetic circuit for rendering the switch means inoperative and an automatic cut-off mechanism operated by the film record for operating the electromagnetic circuit, said cut-off mechanism comprising a normally inoperative switch member and an actuator therefor and operatively connected thereto, said actuator being automatically positionable by engagement with the supply reel of said film record, said actuator being movable from a normally inoperative position to another inoperative position by the supply reel engaging the same when the film record is placed into the reproducer and being then movable first to an operative position to actuate said switch member as the reel is depleted and then to its normal inoperative position after the switch member has been actuated.

8. In a film record sound reproducer, in combination with a magazine, a film record in the magazine and a driving means for the film record, an automatic cut-off mechanism operated by the film record for stopping the driving means comprising a normally inoperative switch member and a linearly movable actuator therefor and operatively connected thereto, said actuator being automatically positionable by engagement with the supply reel of said film record, said actuator being movable from a normally inoperative position to another inoperative position by the supply reel engaging the same when the film record is placed into the reproducer and being then movable reversely first to an operative position to actuate said switch member as the reel is depleted and then to its normal inoperative position after the switch member has been actuated and when the magazine is removed from the reproducer.

9. In a disc record and film record sound reproducer, a motor common to the drive of the disc record and film record, a reproducer system for the film record, first switch means for the motor, manual means for operating said first switch means, second switch means for the reproducer system, manual means for operating said first switch means, said manual means being selectively operative to drive the motor with or without energizing the reproducer system for the film record, and automatic cut-off mechanism controlled by the film record for moving both switch means to an inoperative position.

10. In a disc record and film record sound reproducer, a motor common to the drive of the disc record and film record, a reproducer system for the film record, first switch means for the motor, manual means for operating said first switch means, second means for the reproducer system, manual means for operating said second switch means, said manual means being selectively operative to drive the motor with or without energizing the reproducer system for the film record, and automatic cut-off mechanism controlled by the film record for moving both switch means to an inoperative position, said mechanism being normally in an inoperative position.

11. A film record sound reproducer comprising a frame, a supply reel positionable in said frame, a film record on said supply reel and adapted to be unwound therefrom, a driving means operatively connectable to said film record so as to unwind the same from said supply reel, and an automatic cut-off mechanism on said frame operated by the film record for stopping the driving means, said cut-off mechanism comprising a switch member on said frame and an actuator on said frame operatively connected to said switch member and movable sequentially between three positions with respect to said switch member, a first inoperative position in which said switch is not actuated, an operative position in which said switch is actuated, and a second inoperative position in which said switch is not actuated, said actuator being engaged with the film record on said supply reel and positioned thereby in said first inoperative position when said supply reel is placed in the reproducer and then, as the film record is unwound from said supply reel, being moved through engagement with said film record first to its operative position to actuate said switch member and then to its second inoperative position after said switch member has been actuated.

12. The film record sound reproducer of claim 11, in which said actuator is normally in its second inoperative position, and in which it is moved from said second inoperative position to said first inoperative position by engagement with the film record on said supply reel when said supply reel is placed in the reproducer.

13. The film record sound reproducer of claim 11, in which said switch member comprises a pair of contacts and a bridging plate relatively articulately mounted, and in which said actuator is operatively connected to said switch member so as to cause relative motion between said contacts and said plate so that said plate bridges and connects both of said contacts only when said actuator is in its operative position.

14. The film record sound reproducer of claim 11, in which said switch member comprises a first arm carrying a contact and a second arm carrying a cooperating contact, said arms being relatively movable between an actuated position in which said contacts operatively engage and an inoperative position in which said contacts do not operatively engage, and in which said actuator is operatively connected to one of said arms so as to move it to actuated position only when said actuator is in its operative position.

15. The film record sound reproducer of claim 11, in which said switch member comprises first and second pivotal arms spring urged toward one another, one of said arms carrying a pair of separated contacts and the other arm carrying a bridging plate engageable with one or both of said contacts depending upon the relative positions of said arms, and in which said actuator is operatively connected to one of said arms so as to pivot it, as said actuator is moved from its first inoperative position through its operative position to its second inoperative position, so that said bridging plate engages one, both, and the other of said contacts respectively.

16. A film record sound reproducer comprising a frame, a magazine positionable thereon in an operative position, a supply reel in said magazine, a film record on said supply reel and adapted to be unwound therefrom, a driving means operatively connectable to said film record so as to unwind the same from said supply reel, and an automatic cut-off mechanism on said frame operated by the film record for stopping the driving means, said cut-off mechanism comprising a switch member on said frame and an actuator on said frame operatively connected to said switch member and movable sequentially between three positions with respect to said switch member, a first inoperative position in which said switch is not actuated, an operative position in which said switch is actuated, and a second inoperative position in which said switch is not actuated, said actuator being engaged with the film record on said supply reel and positioned thereby in said first inoperative position when the magazine is placed in the reproducer and then, as the film record is unwound from said supply reel, being moved through engagement with said film record first to said operative position to actuate said switch member and then to said second inoperative position after said switch member has been actuated.

17. In the film record sound reproducer of claim 11, a switch means for the driving means, manual means for operating said switch means, and an electromagnetic circuit for rendering the switch means inoperative, said cut-off mechanism operating said electromagnetic circuit.

18. The film record sound reproducer of claim 11, in which said actuator is linearly movable in one direction from its second inoperative position to its first inoperative position when said film record is placed in the reproducer and is then linearly movable reversely first to its operative position to actuate the switch member and then to its second inoperative position after the switch member has been actuated and when the film record is removed from the reproducer.

FREEMAN H. OWENS.

REFERENCES CITED

The following references are of record in the file of this patent:

UNITED STATES PATENTS

| Number | Name | Date |
|---|---|---|
| 1,068,119 | Foote | July 22, 1913 |
| 1,538,510 | Bonk | May 19, 1925 |
| 1,897,903 | Hopkins | Feb. 14, 1933 |
| 1,952,809 | Kuchenmeister | Mar. 27, 1934 |
| 2,002,352 | Owens | May 21, 1935 |
| 2,091,688 | Owens | Aug. 21, 1937 |
| 2,335,277 | Heller | Nov. 30, 1943 |
| 2,422,143 | Somers et al. | June 10, 1947 |